United States Patent [19]

Boatwright

[11] Patent Number: 4,921,663
[45] Date of Patent: May 1, 1990

[54] END PLUG WELD FOR NUCLEAR FUEL ROD

[75] Inventor: David A. Boatwright, Columbia, S.C.

[73] Assignee: Westinghouse Electric Corp., Pittsburgh, Pa.

[21] Appl. No.: 202,650

[22] Filed: Jun. 6, 1988

[51] Int. Cl.⁵ .............................................. G21C 3/10
[52] U.S. Cl. ..................................... 376/451; 376/261
[58] Field of Search ................. 376/451, 261; 29/271, 29/270, 235, 234, 237, 244

[56] References Cited

U.S. PATENT DOCUMENTS

| | | | |
|---|---|---|---|
| 3,086,934 | 4/1963 | Morrison | 376/451 |
| 3,092,565 | 6/1963 | Williams et al. | 376/451 |
| 3,145,150 | 8/1964 | Gylfe | 376/451 |
| 3,157,580 | 11/1964 | Williams | 376/451 |
| 3,189,525 | 6/1965 | Davis | 376/451 |
| 3,212,988 | 10/1965 | Ringot | 376/451 |
| 3,222,256 | 12/1965 | Fletcher et al. | 376/451 |
| 3,725,635 | 4/1973 | Fink et al. | 219/121 P |
| 3,836,431 | 9/1974 | Flipot et al. | 376/451 |
| 4,003,788 | 1/1977 | Boyko et al. | 376/451 |
| 4,587,094 | 5/1986 | Bucher | 376/451 |
| 4,642,217 | 2/1987 | Wilson et al. | 376/451 |
| 4,679,377 | 7/1987 | Rieben et al. | 53/327 |
| 4,716,018 | 12/1987 | Boatwright | 376/451 |
| 4,747,997 | 5/1988 | Boatwright | 376/261 |

FOREIGN PATENT DOCUMENTS

| | | | |
|---|---|---|---|
| 2286474 | 4/1986 | France | 376/451 |
| 896826 | 5/1962 | United Kingdom . | |

Primary Examiner—Donald P. Walsh
Attorney, Agent, or Firm—J. C. Spadacene

[57] ABSTRACT

An end plug is welded to a nuclear fuel rod tube by a girth weld having a melt-zone arcuately extending through the tube wall and into the plug, wherein the melt-zone and the end of the tube are separated by a predetermined distance. The distance is chosen such that heat is dissipated from the weld-zone to prevent damage to the rod and to prevent damage to the weld end stop. This weld enables the use of a substantially solid cylindrical end plug having a first end disposed inside the tube, a second end, and a hollow cavity extending to the second end for axially aligning the cylinder and fuel rod with a frictionally engaging weld stop during formation of the girth weld.

11 Claims, 3 Drawing Sheets

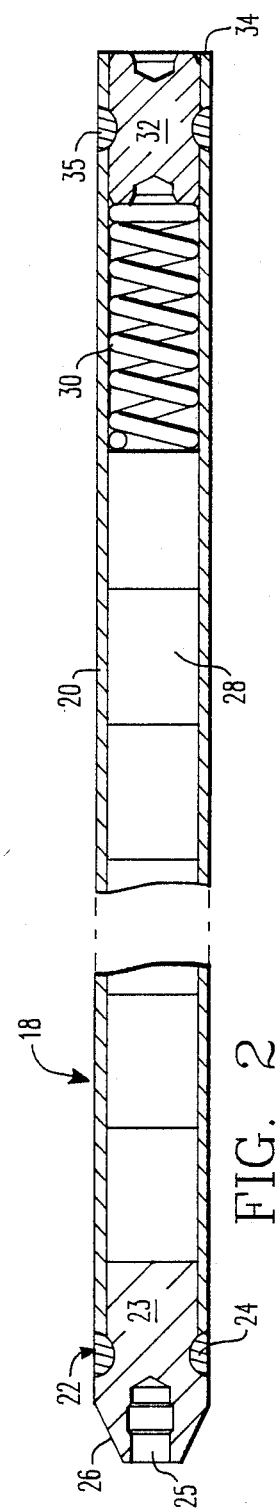
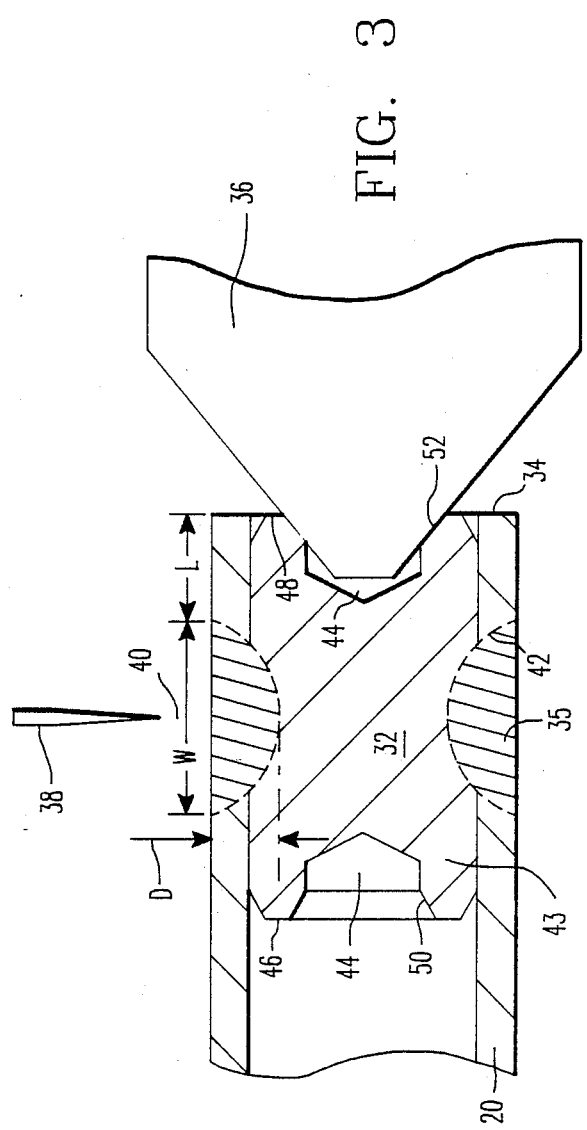

END PLUG WELD FOR NUCLEAR FUEL ROD

BACKGROUND OF THE INVENTION

This invention, in its preferred form, relates generally to nuclear fuel rods, and more particularly, to an improved end plug-to-tube girth weld which minimizes the possibility of tube damage and allows for a simplified end plug design.

In a typical nuclear reactor, the reactor core includes a large number of fuel assemblies. Conventional designs of these fuel assemblies include top and bottom nozzles, a plurality of elongated transversely spaced guide thimbles extending longitudinally between and connected at opposite ends thereof to the nozzles, and a plurality of transverse spacer grids axially spaced along the guide thimbles. Each fuel assembly also includes a multiplicity of elongated fuel rods transversely spaced apart from one another and from the guide thimbles and supported by the grids between the top and bottom nozzles. The fuel rods each contain fissile material in the form of pellets, and are grouped together in an array which is organized so as to provide a neutron flux in the core sufficient to support a high rate of nuclear fission and thus the release of a large amount of energy in the form of heat A coolant is pumped upwardly through the core in order to extract the heat generated in the core for the production of useful work.

In the manufacture of the fuel rods, each rod is, in general sequence, capped at one end by insertion and girth welding of a bottom end plug, loaded with a plurality of nuclear fuel pellets, inserted with a spring element to prevent the pellets from shifting during transportation of the completed fuel assembly, and capped with a top end plug at the second end of the rod. The rod is normally pressurized by one of several processes with an inert gas such as nitrogen for preventing collapse of the fuel rod at beginning of life in the reactor core. The process normally includes the evacuation of air and subsequent pressurization of the rod with the inert gas and final sealing of the rod by either: (1) a girth weld of the end plug if the end plug is inserted into a prepressurized rod; or (2) a seal weld of a small channel such as an axial or radial bore which extends through the end plug, if the end plug is inserted and girth welded before pressurization.

Top end plugs of the prior art, hereinafter referred to as "two-tiered end plugs" generally are cylindrical in shape, having a first body portion with an outer diameter marginally larger than the inner diameter of the fuel rod for forced insertion therein, a second body portion with an outer diameter substantially equal to the outer diameter of the fuel rod, and a transition area comprising a shoulder between the second portion and the first portion which conforms with the end of the fuel rod in a butt joint for welding thereto. As is well known in the art, the formation of the girth weld around the circumference of the rod bonding the rod to the end plug requires that the end of the fuel rod be held in close tolerance with respect to the welding electrode while the rod and electrode are rotated one revolution with respect to each other. Thus, the welding process is best carried out with support for the rod and support for the end plug. This support of the two-tiered end plug usually takes the form of a cavity in a welding end stop, which end stop conforms to the shape of and surroundingly frictionally contacts the outer portion of the end plug during welding. This end stop prevents lateral movement of the plug and rod during welding thereof, thereby maintaining the proper distance between the rod, end plug, and the electrode.

The end stop must be a sufficient distance from the weld electrode to prevent interference with the weld and potential damage to the end stop. For this reason, two-tiered end plugs normally have substantial outer body portions axially extending from the rod end, and the girth weld is performed at the junction of the rod end and the shoulder of the outer body portion of the end plug. This weld normally results in a smooth junction between the rod end and the end plug, which is desirable for minimizing pressure drop of coolant fluid through the core, and which avoids a disjoint surface at the rod/end plug interface that could be subject to erosion or corrosion. A problem encountered with this type of girth weld is that if the electrode is biased too close to the rod end, heat will not dissipate through the rod and may cause the end of the rod to "peel back" from the weld, thereby causing rejection of the rod which requires reworking or scrapping the rod. Problems encountered with the butt joint girth weld are described in U.S. Pat. No. 3,725,635, commonly assigned to the assignee of the present invention.

An alternative weld as known in the art is performed on an end plug that lies flush with the end of the tube by performing a weld of the circumferential seam between the rod inner diameter and the plug outer diameter. However, this weld is also susceptible to causing peal back, due to the thinness of the rod wall and the location of the weld melt zone.

In addition to the problems encountered with normal welds as outlined above, two-tiered end plugs have distinct problems which may be overcome by a simplified end plug design that could be facilitated by an improved weld. The two-tiered end plug is fairly expensive to manufacture due to the high volume of material of the plug and due to the method of manufacture, which may include machining the plug from bar stock, which is wasteful of material, or molding the plug and machining it to required tolerances. Further, a problem encountered in inserting the two-tiered end plug is orienting and maintaining the end plug with the proper smaller diameter end facing the rod for insertion therein. The tendency of the end plug to become inverted could lead to severe damage of the plug, the rod, and perhaps the insertion mechanism. Also, due to the smaller diameter body portion that is inserted in the rod, the two-tiered end plug has a tendency to cock or tip, causing abrasion of the second body portion and contributing to faulty welds or improper end plug seating in the rod. Pieces of the plug may also be broken off as the skewed plug is pushed into the rod, damaging the end plug or the rod and causing foreign objects to be deposited in the fuel rod. One apparatus to overcome this problem is disclosed in U.S. Pat. No. 4,679,377, assigned to the assignee of the present invention, wherein a guide channel has a cross-sectional size smaller than that of the end plug and when contacted by the moving plug yieldably expands such that the guide channel conforms to the external surface of the end plug, thereby maintaining guiding contact therewith as the end plug is moved through the guide channel to the rod.

Therefore, what is needed is an improved weld of an end plug to a fuel rod, enabling a simplified design of the end plug that is easier and less expensive to manufacture, one that will not tip during insertion in the fuel rod, and that is less sensitive to its orientation during the insertion process.

SUMMARY OF THE INVENTION

The present invention is directed to a nuclear fuel rod comprising a tube having an end; and end plug disposed within the end; and a girth weld joining the end plug to the tube, the girth weld having a weld-zone arcuately extending through the tube wall and into the plug, the weld-zone and the tube-end being separated by a predetermined distance Preferably, the distance is satisfactory for dissipating heat from the weld-zone such that the end will not peel back during formation of the weld.

The invention is further directed to the end plug welded by the girth weld above described, wherein the end plug is a top end plug comprising a substantially solid cylinder having a first end disposed inside the tube, a second end, and a hollow cavity extending to the second end for axially aligning the cylinder with a frictionally engaging weld stop during formation of the girth weld.

DESCRIPTION OF THE DRAWINGS

The invention will become more readily apparent from the following description of preferred embodiments thereof shown, by way of example only, in the accompanying drawings, wherein:

FIG. 2 is a foreshortened view of a sectioned nuclear fuel rod incorporating a top end plug welded to the rod in one embodiment of the present invention.

FIG. 3 is an enlarged view of a sectioned fuel rod, showing the top end plug and weld in position of girth welding.

DESCRIPTION OF THE PREFERRED EMBODIMENT

Figure 1:
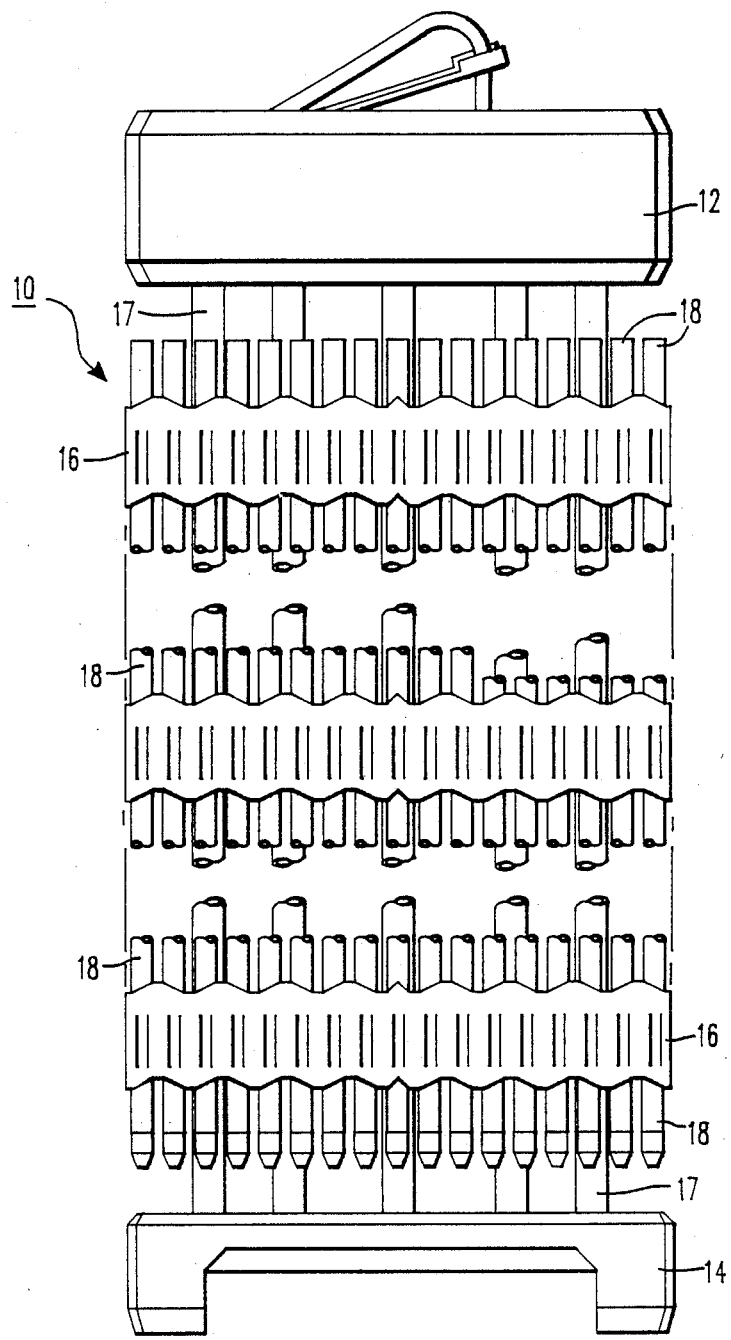
FIG. 1 is an elevational view, partly in section, of a nuclear fuel assembly.

Reference will now be made in detail to several present preferred embodiments of the invention, some examples of which are illustrated in the accompanying drawings. In the drawings, like reference characters designate like or corresponding parts throughout the several views. Looking first at FIG. 1 a typical Pressurized Water Reactor (PWR) fuel assembly 10 is a self-contained unit comprised of a top nozzle 12 and a bottom nozzle 14, between which are disposed a plurality of nuclear fuel assembly grids 16, the grids 16 being fixedly attached to a plurality of thimble tubes 17, which in turn are joined at their respective ends to the nozzles 12, 14. The nozzles 12, 14, the thimbles 17, and the grids 16 provide a skeletal frame to support, in proper configuration, a matrix of nuclear fuel rods 18 arrayed in rows and columns. The fuel assemblies 10 are loaded into predetermined locations within a nuclear reactor (not shown) whereby the orientation of the fuel rods 18 with respect to each other is rigorously controlled.

Looking now at FIG. 2, a single nuclear fuel rod 18 is shown. The fuel rod 18 comprises an elongated tube 20, generally made of an alloy of zirconium, but also amenable to manufacture of steel or aluminum. A typical PWR fuel tube is about 2.66 meters (12 feet) long with an outer diameter of about 0.95 cm (0.374 inch). A first end 22 of the tube 20 has a bottom end plug 23 inserted therein and joined thereto by a conventional butt joint girth weld 24 for sealing the first end 22 thereof. The bottom end plug 23 normally includes means 25 for allowing the nuclear fuel rod 18 to be grasped and pulled through the grids 16 during manufacture of the fuel assembly 10, and usually has a smooth and tapered leading edge 26 to enhance cooling fluid flow over the rod 18. Disposed along the length of the tube 20 are a plurality of nuclear fuel pellets 28, which are usually sintered pellets of uranium dioxide, enriched in the thermally fissionable isotope U-235 from about 1 to 4 percent. Further, a spring 30 is inserted in at least one end of the tube 20, for preventing movement of the pellets 28 during shipment of the fuel assembly 10. The fuel rod 18 finally includes a substantially solid cylindrical top end plug 32 inserted in the second end 34 of the tube, which is generally manufactured from the same material as the tube. During manufacture of the fuel rod 18, the tube 20 is evacuated of air and pressurized with an inert gas such as helium to about 2.76 MPa (400 psig). The top end plug 32 is then inserted to seal the second end 34 of the tube 20. A typical fuel rod tube 20 has an inner diameter of about 0.84 cm (0.329 inch), and the end plug 32 will preferably have an outer diameter greater than the inner diameter of the tube by about 0.00025–0.01 cm (0.0001–0.004 inch), requiring a press or interference fit of the end plug 32 into the tube 20. The helium pressure within the rod 18 is therefore insufficient to eject the top end plug 32 when inserted, since the contact force between the plug 32 and the tube 20 may be in excess of 4.45 kN (1000 pounds). The top end plug 32 is then welded to the tube 20 by a through-tube-wall girth weld 35.

Looking now at FIG. 3, the top end plug 32 and second end 34 of the tube 20 are shown in position of welding. The tube 20 is brought into the welding apparatus (not shown) and the end plug 32 is caused to frictionally engage a weld stop 36. Various apparatus (not shown) may be used to support and maintain the pressure of the rod 20 against the weld stop 36 while performing the girth weld 35, as is well known in the art, and thus do not need to be described herein for a complete understanding by those skilled in the art. The through-tube-wall girth weld 35 is formed by energization of an electrode 38 which is maintained at a gap 40 of about 0.05 cm (0.02 inch) from the outer surface of the tube 20. The melt-zone 42 of the weld 35 must circumferentially intersect the top end plug 32 so as to perfectly seal the plug 32 to the tube 20. Therefore, extremely tight tolerance, preferably less than plus or minus 10 percent, should be maintained in the gap 40. To reliably achieve this seal, it is preferred that the melt-zone 42 have a depth D of greater than about 1.25 times the wall thickness and a width at the surface of the rod W of about 2 times the wall thickness of the tube 20, which wall thickness is usually 0.056–0.058 cm (0.022–0.023 inch) The girth weld 35 of the present invention is located a predetermined distance L from the end of the tube 20 for preventing peel back of the end 34 during formation of the weld 35. This distance L should be at least sufficient to allow dissipation of heat from the melt-zone 42, to thereby prevent peel back and to preferably prevent damage to the weld-stop 36. Experimentation has shown that this distance L should be greater than about 0.1 cm (0.05 inch) and preferably greater than about 0.25 cm (0.1 inch).

The through-wall girth weld 35 requires extremely close control of welding power. The girth weld 35 will generally be formed with a current of from 18 to 36 amperes through the electrode 38, and preferably about 22 amps. The required close tolerance of about ±1 amp is provided by state of the art controls such as the AMP-TRAK Micro 1-B power supply available from Merrick Engineering, Inc. of Nashville, Tennessee.

To maintain the end 34 of the tube 20 in axial alignment during the formation of the weld 35, the top end plug 32 comprises a substantially solid cylinder 43 having preferably two hollow cavities 44, one cavity 44 extending to a first end 46 and the other extending to a second end 48 of the cylinder 43. Both ends 46, 48 are preferably identical for ease of manufacture and for enabling easy installation, whereby either end 46, 48 of the top end plug 32 may be inserted into the tube 20 without concern for orientation, thereby simplifying the tooling used to insert the top end plug 32 in the tube 20. It is desirable from a design point of view to minimize the length of the tube 20 and minimize the length of the end plug 32 while maximizing the free space within the fuel rod 18; this is achieved if the weld melt-zone 42 is centered longitudinally on the end plug 32 and the second end of the plug 48 lies substantially flush with the end of the tube 20.

Each cavity 44 preferably includes a tapered edge 50 for mating with the surface 52 of the weld stop 36. Thus, when the tube 20 is held in position with the top end plug 32 frictionally engaging the weld stop 36, the cylinder 43 and thus the tube 20 will not radially or laterally shift, thereby maintaining the tight tolerance on the gap 40 with the electrode 38.

Figure 5:
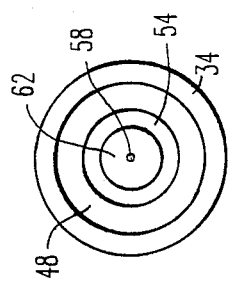
FIG. 5 is an end-on view of the fuel rod of FIG. 4 along lines V—V.
Figure 4:
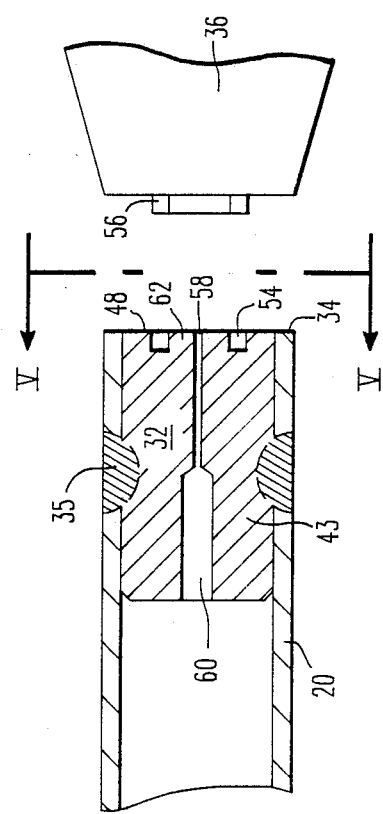
FIG. 4 is an enlarged view of a sectioned fuel rod showing an alternative top end plug.

Looking now at FIGS. 4 and 5, an alternative end plug embodiment is presented. Again, a top end plug 32 comprises a cylinder 43, which, when inserted in the second end 34 of the tube 20, has a second end 48 which lies substantially flush with the end 34 of the tube 20. The cylinder 43 includes a trepanned hollow cavity 54 extending to the second end 48 of the cylinder 43. This cavity 54 must be deep enough to provide sufficient supporting engagement with the weld stop 36, for example deeper than about 0.125 cm (0.05 inch), but not so deep as to require a very long end plug 32 to keep the melt-zone distance L a sufficient distance from the weld-stop 36, therefore preferably less than about 0.25 cm (0.1 inch). The preferable end plug has a length of less than about 1.0 cm (0.4 inch), preferably about 0.89 cm (0.35 inch), or the force required for insertion of the plug 32 in the rod 18 becomes too great and the risk of damaging the tube 20 increases drastically.

As shown in FIG. 4, the weld stop 36 likewise has a trepanned surface 56 for alignment within the cavity 54 of the top end plug 32. This embodiment further includes an axial seal bore 58 extending through the cylinder 43 for pressurizing the tube 20 after formation of the girth weld 35. A larger diameter axial bore hole 60 with a diameter of about 0.64 cm (0.25 inch) is drilled partly through the cylinder 43 to minimize the expense of drilling the small diameter seal bore 58, which has a diameter of about 0.1 cm (0.04 inch). After pressurization of the fuel rod 18 through the seal bore 58, a seal weld (not shown) is effected at the end of the bore 58, where the rim 62 extending between the trepanned cavity 54 and the seal bore 58 is melted to seal the bore 58.

From the foregoing, it will be obvious to those skilled in the art that other embodiments are possible, wherein for example the weld stop 36 and the cavity 44 may be threaded, or there may be a plurality of cavities 44 extending to the outer end 48 of the plug 32 for alignment on equivalently aligned studs (not shown) extending from the weld stop 36, or the weld stop and the end plug are in any like manner interlocking.

The benefits of this invention will be obvious to those skilled in the art, wherein the ease of manufacture from centerless ground stock, execution of simple machining steps, and the small amount of material involved will be seen to result in substantial cost savings.

It will be apparent that many further modifications and variations are possible in light of the above teachings. It is, therefore, to be understood that within the scope of the appended claims, the invention may be practiced other than as specifically described.

What is claimed is:

1. A nuclear fuel rod comprising:
   a. a tube having a wall, a hollow interior portion and at least one end portion;
   b. an end plug having a cylindrical body portion with a pair of opposing plug end portions substantially perpendicular therewith, substantially all of said end plug being disposed within said tube hollow interior portion so that one of said end plug end portions is substantially flush with said tube end portion; and
   c. a girth weld defining a melt zone and extending circumferentially around said tube and said end plug for sealingly connecting said end plug within said tube hollow interior portion, said girth weld being spaced from said tube end portion by a distance L sufficient to provide that said melt zone extends arcuately through said tube wall and into said end plug at said end plug cylindrical body portion.

2. The fuel rod as claimed in claim 1, wherein said distance L is greater than about 0.1 centimeter.

3. The fuel rod as claimed in claim 1, wherein said distance L is between 0.25 cm and 0.5 cm.

4. The fuel rod as claimed in claim 1, wherein said melt-zone is centered longitudinally on said end plug cylindrical body portion.

5. The fuel rod as claimed in claim 1, wherein said end plug includes a first hollow cavity portion extending from said plug end portion positioned substantially flush with said tube end portion into said end plug cylindrical body portion; and
   said first hollow cavity portion is adapted to receive a portion of a frictionally engaging end stop for axially aligning said end plug and tube with said end stop.

6. The nuclear fuel rod as recited in claim 5, wherein said hollow cavity portion is generally tapered inwardly from said plug end portion positioned substantially flush with said tube end portion towards said end plug cylindrical body portion.

7. The nuclear fuel rod as recited in claim 5, wherein said hollow cavity portion is trepanned.

8. The nuclear fuel rod as recited in claim 7, wherein said end plug further includes an axial seal bore, for permitting the pressurization of said rod.

9. The nuclear fuel rod as recited in claim 5, wherein said end plug includes a second hollow cavity portion extending from said plug end portion opposite said plug end portion positioned substantially flush with said tube end portion into said end plug cylindrical body portion.

10. The fuel rod as claimed in claim 5, wherein said melt-zone has a depth D greater than about 1.25 times the wall thickness of said tube.

11. The fuel rod of claim 1, wherein said tube and said end plug are formed from zirconium alloy.

* * * * *